(12) United States Patent
Kim et al.

(10) Patent No.: US 10,089,705 B2
(45) Date of Patent: Oct. 2, 2018

(54) SYSTEM AND METHOD FOR PROCESSING LARGE-SCALE GRAPHS USING GPUS

(71) Applicant: Daegu Gyeongbuk Institute of Science and Technology, Daegu (KR)

(72) Inventors: Min Soo Kim, Daegu (KR); Hyun Seok Seo, Daegu (KR); Jin Wook Kim, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 399 days.

(21) Appl. No.: 14/658,325

(22) Filed: Mar. 16, 2015

(65) Prior Publication Data
US 2016/0125566 A1    May 5, 2016

(30) Foreign Application Priority Data
Oct. 29, 2014    (KR) ........................ 10-2014-0148566

(51) Int. Cl.
G06T 1/20       (2006.01)
G06T 1/60       (2006.01)
G06F 17/10      (2006.01)

(52) U.S. Cl.
CPC ................ *G06T 1/20* (2013.01); *G06F 17/10* (2013.01); *G06T 1/60* (2013.01)

(58) Field of Classification Search
CPC .. G06F 17/10; G06F 17/30; G06F 17/305416; G06F 17/30445;
(Continued)

(56) References Cited

U.S. PATENT DOCUMENTS 8,184,120 B2    5/2012    Hong et al.
8,373,710 B1 *  2/2013    Vij .................. G06F 9/5044
                                                   345/502
(Continued)

FOREIGN PATENT DOCUMENTS

KR         10-1245994 B1     3/2013

OTHER PUBLICATIONS

Grzegorz Malewicz, Matthew H. Austern, Aart J.C Bik, James C. Dehnert, Ilan Horn, Naty Leiser, and Grzegorz Czajkowski. 2010. Pregel: a system for large-scale graph processing. In Proceedings of the 2010 ACM SIGMOD International Conference on Management of data (SIGMOD '10). ACM, New York, NY, USA, 135-146. DOI: https://doi.org/10.1145/1807167.1807.*

*Primary Examiner* — Maurice L McDowell, Jr.
*Assistant Examiner* — Donna J Ricks
(74) *Attorney, Agent, or Firm* — Nixon & Vanderhye P.C.

(57) ABSTRACT

The present invention relates to a system and method for processing a large scale graph using GPUs, and more particularly, to a system and method capable of processing larger-scale graph data beyond the capacity of device memory of GPUs using a streaming method. A large-scale graph processing system using GPUs according to an aspect of the present invention includes a main memory, device memories of a plurality of GPUs that process graph data transferred from the main memory; a loop controller that processes graph data transfer in a nested loop join scheme in the graph data transfer between the main memory and the device memory of the GPU, and a streaming controller that copies the graph data to the device memory of the GPU in a chunk or streaming manner using a GPU stream according to the nested loop join scheme.

9 Claims, 11 Drawing Sheets

(58) Field of Classification Search
CPC ......... G06F 17/30109; G06F 17/30097; G06F 17/30159; G06F 17/30174; G06F 17/30176; G06F 17/30224; G06F 17/3033; G06F 17/30466; G06F 17/30498; G06F 17/30958; G06F 17/30991; G06T 1/20; G06T 1/60; G06T 11/206

See application file for complete search history.

(56) References Cited

U.S. PATENT DOCUMENTS

| | | | |
|---|---|---|---|
| 9,137,336 B1 * | 9/2015 | Zalunin | H04L 69/04 |
| 9,201,638 B2 * | 12/2015 | Ravi | G06F 8/443 |
| 9,424,079 B2 * | 8/2016 | Rossbach | G06F 9/4843 |
| 2014/0049550 A1 | 2/2014 | Chen et al. | |

\* cited by examiner

SYSTEM AND METHOD FOR PROCESSING LARGE-SCALE GRAPHS USING GPUS

CROSS-REFERENCE TO RELATED APPLICATION

This application claims priority to and the benefit of Korean Patent Application No. 10-2014-0148566, filed on Oct. 29, 2014, the disclosure of which is incorporated herein by reference in its entirety.

FUNDING STATEMENT

This invention was supported by Samsung Research Funding Center of Samsung Electronics under Project Number SRFC-IT1401-04.

BACKGROUND

1. Field of the Invention

The present invention relates to a system and method for processing a large scale graph using GPUs, and more particularly, to a system and method capable of processing larger-scale graph data beyond the capacity of GPU device memory using a streaming method.

2. Discussion of Related Art

A graph processing system using GPUs can process a graph algorithm at a higher speed than a speed of a CPU by using GPUs having a higher throughput than the CPU.

A method of processing graph data having a scale that can be stored in a device memory mounted on a GPU has been proposed in a graph processing system using GPUs in the related art.

When the graph data having a scale that can be stored in the device memory is processed, there is an advantage that processing can be performed at a higher speed due to the high throughput of the GPU, unlike the CPU.

However, when a larger-scale graph beyond the capacity of GPU device memory is processed, the graph is divided into a part that can be stored in a GPU memory and a part that can be stored in a main memory.

Only the graph on the GPU memory is processed by the GPU, and the other graph on the main memory is processed by the CPU. Accordingly, as the scale of the graph becomes larger, it causes a problem in that degradation of performance.

Further, for graph data, when the numbers of partitions divided due to the increasing number of GPUs increases, duplication of data among the GPUs increases, and thus, graph processing performance is degraded. That is, scalability according to the increasing number of GPUs is not good.

Thus, importance of the method of processing large-scale graph data has been recognized, but research and technology development for a method for solving these technical problems have not been performed.

SUMMARY OF THE INVENTION

The present invention has been proposed to solve the aforementioned problems, and an object of the present invention is to provide a system and method capable of effectively processing and suggesting large-scale graph data (for example, billions vertices) by processing larger-scale graph data beyond the capacity of GPU device memory as well as graph data having a scale that can be stored in the device memory using a streaming method, and to provide a system and method with scalable performance according to a scale of graph data and the number of GPUs included in a system.

A large-scale graph processing system using GPUs according to an aspect of the present invention includes: a main memory including graph data; device memories of a plurality of GPUs that process the graph data transferred from the main memory; a loop controller that processes graph data transfer in a nested loop join scheme in the graph data transfer between the main memory and the device memory of the GPU; and a streaming controller that copies outer data included in the attribute data to the device memory of the GPU in a chunk manner and copies inner data included in the topology data to the device memory of the GPU in a streaming manner using a GPU stream according to the nested loop join scheme.

A large-scale graph processing method using GPUs according to another aspect of the present invention includes: a system Initialization step of loading graph data, generating a GPU stream for processing the loaded graph data, assigning corresponding buffers to outer data and inner data, and including a page in a processing-requested set; an outer loop processing step of copying the outer data in the graph data to a device memory of the GPU; a step of copying information regarding the page IDs capable of being used as a cache in inner loop work and information regarding the page IDs to be processed in an inner loop process to a main memory, the information being currently stored in the device memory; a step of merging ID information of a page to be processed in a next step in main memory; and a step of confirming whether there is the page to be processed in a processing-required set.

With the large-scale graph processing system and method using GPUs according to the present invention, it is possible to not only process smaller graph data than the device memory, but also larger-scale graph data beyond the capacity of device memory with scalable performance according to the scale of data and the number of GPUs included in the system through the streaming method, which has not been proposed in the related art.

That is, it is possible to process the graph with excellent performance even when processing a larger-scale graph beyond the capacity of GPU device memory, by proposing a method of processing the graph while transferring the topology data to the GPU using a streaming method for a graph algorithm requiring search of all pieces of topology data, such as PageRank, and recognizing only the topology data necessary for search based on vertices being searched in each step and transferring the topology data to the GPU using a streaming method for a graph algorithm that searches for only partial topology data, such as a BFS.

Therefore, the present invention is applied to various data processing fields, such as social network service, web service, business intelligence, life science, or neuroscience that utilizes a graph form in data representation, such that a graph streaming process using a GPU can be realized.

Effects of the present invention are not limited to the above-mentioned effects, and other effects not mentioned will be clearly understood by those skilled in the art from the following.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and characteristics of the present invention, and a method of achieving these will be apparent by referring to embodiments to be described below in detail together with the accompanying drawings. However, the present invention is not limited to the embodiments disclosed below and may be implemented in various different forms. The embodiments are provided so that disclosure of the present invention is sufficient and the category of the invention can be easily understood by those skilled in the art. The present invention is defined by claims. Meanwhile, the terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, preferred embodiments of the present invention will be described in detail with reference to the drawings.

Figure 1:
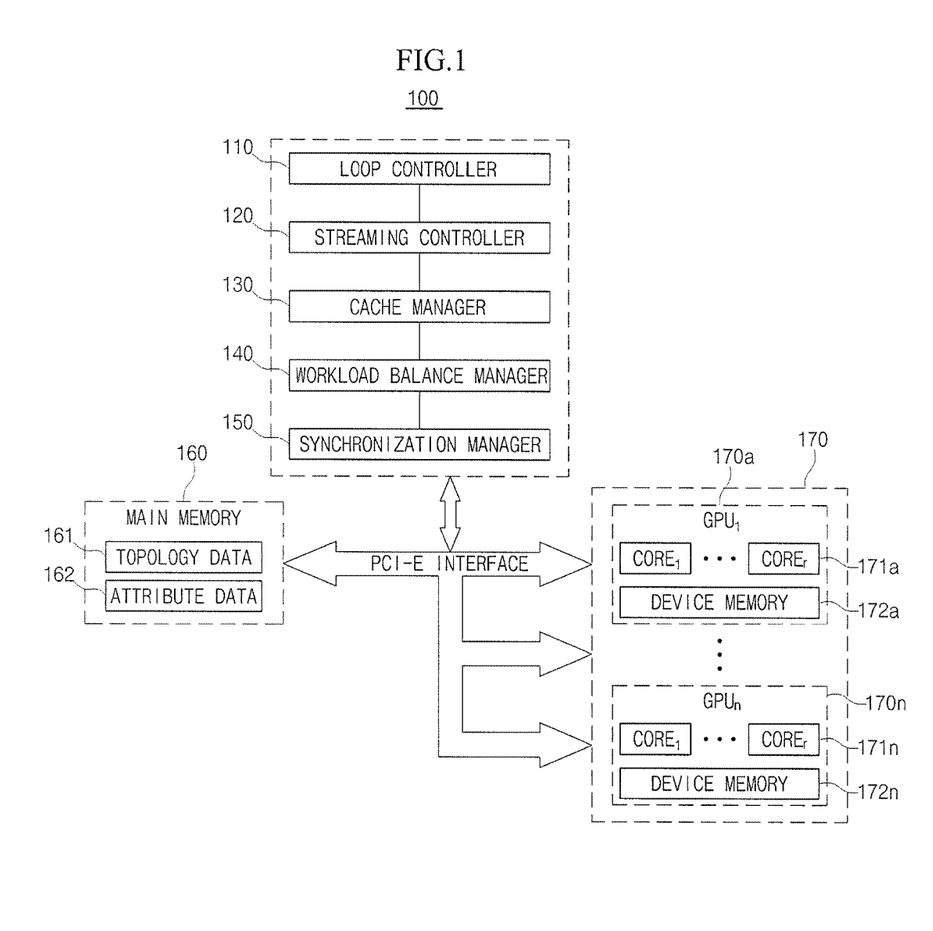
FIG. 1 is a block diagram illustrating a large-scale graph processing system using GPUs according to an embodiment of the present invention.

FIG. 1 is a block diagram illustrating a large-scale graph processing system 100 using GPUs according to an embodiment of the present invention. The large-scale graph processing system 100 using GPUs according to an embodiment of the present invention includes a main memory 160 including graph data, device memories 172 of a plurality of GPUs 170 that process the graph data transferred from the main memory 160, a loop controller 110 that processes graph data transfer in a nested loop join scheme in the graph data transfer between the main memory 160 and the device memory 172 of the GPU, and a streaming controller 120 that copies outer data included in the graph data to the device memory 172 of the GPU in a chunk manner and copies inner data included in the graph data to the device memory 172 of the GPU in a streaming manner using a GPU stream according to the nested loop join scheme.

The main memory 160 according to the embodiment of the present invention includes topology data 161 and attribute data 162 of larger-scale graph data beyond the capacity of device memory 172. Further, the GPU 170 includes a maximum of r cores 171, and a device memory 172.

The GPU 170 serves to process graph data transferred to be processed through a CPU and to perform synchronization work. The CPU (not illustrated) serves to manage graph data processing when the GPU 170 performs the graph data processing.

According to the embodiment of the present invention, a nested loop join scheme is used as a method of processing partial graph data. In the nested loop join scheme, when there are two data sets $X=\{x_1, \ldots, x_p\}$ and $Y=\{y_1 \ldots, y_q\}$, X corresponds to an outer loop, and Y corresponds to an inner loop, a user defined function is performed with a pair $<x_i, y_i>$ for $\{y_1, \ldots, y_q\}$ corresponding to all elements of the Y data set for $x_1$.

When the graph data is processed using the GPUs, which of all pieces of the attribute data and the topology data of the graph data is to be stored in the device memory. Which of the pieces is to be transferred from the main memory and partially processed in the nested loop join scheme has important influence on graph processing performance of the GPUs.

The graph data includes the topology data 161 and the attribute data 162, and the attribute data 162 is classified into read/write attribute data and read only attribute data.

A method of partially processing the classified graph data through the nested loop join includes a topology major strategy and an attribute major strategy.

Generally, in the topology major strategy in which the topology data corresponds to the outer loop and the attribute data corresponds to the inner loop, the attribute data is copied to the device memory of the GPU using a streaming method for each topology chunk data present in the device memory.

Meanwhile, in the attribute major strategy in which the attribute data corresponds to the outer loop, and the topology data corresponds to the inner loop, the topology data is copied to the device memory of the GPU using a streaming method for each attribute chunk data.

Generally, since the attribute data is smaller than the topology data, the number of executions of the outer loop when the attribute data is processed as outer data is smaller than that when the topology data is processed as the outer data.

That is, the large-scale graph processing system 100 using GPUs according to an embodiment of the present invention processes the graph data in the attribute major strategy in terms of potentially small outer data and synchronization overhead. The streaming controller 120 copies the read/ write attribute data in a chunk manner as outer data to be processed by the outer loop according to the nested loop join, and copies the read only attribute data, a small page, and a large page in a streaming manner as inner data to be processed by the inner loop.

The read/write attribute data of which the value is frequently changed during processing of a graph algorithm is copied in a chunk manner through the outer loop.

By using the attribute data 162 smaller than the topology data 161 as the outer data, the number of executions of the outer loop decreases in comparison with the topology major strategy in which the topology data is processed by the outer loop, and the number of synchronizations to be described below decreases.

The topology data and the read only attribute data corresponding to the inner loop are copied in a streaming manner.

A slotted page structure transferred in a fixed size is used so as to copy the topology data of the graph data having neighboring vertices of different sizes at each vertex in a streaming manner.

The slotted page structure is a structure used in the field of a database. In a TurboGraph system of the related art, the slotted page structure was first used to process the graph data on a CPU basis.

However, the graph structure for a streaming process in the embodiment of the present invention is not limited to only the slotted page structure, and it is understood that other structures capable of representing the graph data in a fixed size may be used.

Figure 2:
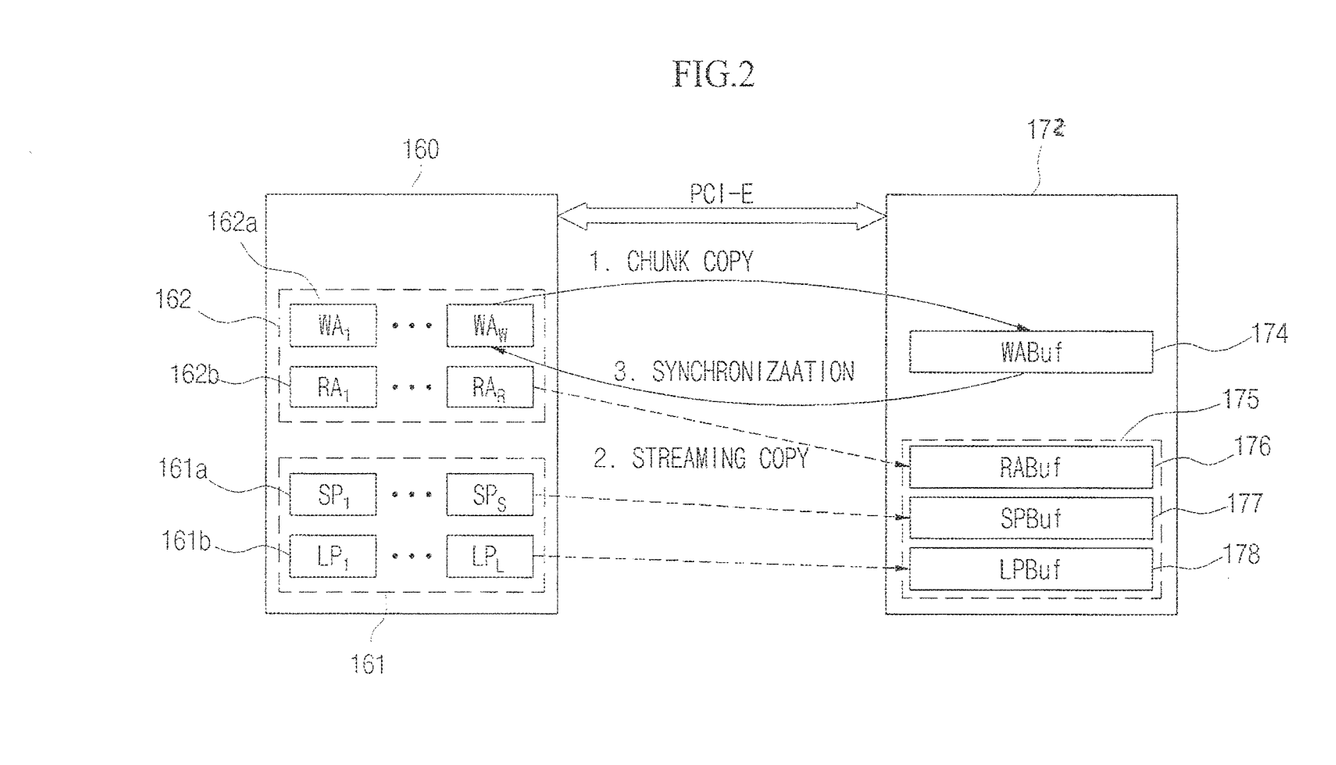
FIG. 2 is a diagram illustrating a data flow of an attribute major strategy between a main memory and a device memory according to an embodiment of the present invention.

FIG. 2 is a diagram illustrating a data flow of the attribute major strategy between the main memory 160 and the device memory 172 according to an embodiment of the present invention.

An illustrated WA 162a indicates read/write attribute data, and RA 162b indicates read only attribute data. WA 162a is divided by W, and RA 162b is divided by R. Only the read/write attribute data 162a among the read/write attribute data 162a and read only attribute data 162b is processed as outer data.

Since the read/write attribute data 162a is frequently changed during processing of a graph algorithm, it is preferable for the read/write attribute data 162a to be maintained in the device memory 172 for securing of performance.

On the other hand, the read only attribute data 162b is data which is not changed during processing of the graph algorithm. A part corresponding to the topology data 161 may be copied in a streaming manner together with the topology data 161 and provided to the device memory 172.

The numbers of small page 161a and large page 161b are S and L, respectively, and the number of pieces of the read only attribute data 162b is R and is generally equal to S.

The device memory 172 of the GPU includes a read/write attribute buffer 174 that processes the read/write attribute data 162a copied as outer data in a chunk manner, and a read only attribute buffer 176 and page buffers 177 and 178 that process the read only attribute data 162b and the topology data 161 copied as inner data in a streaming manner.

According to the embodiment of the present invention illustrated in FIG. 2, larger graph data than the device memory 172 of the GPU is processed, and a PCI-E interface that connects the main memory 160 to the device memory 172 is included.

The main memory 160 includes the small page 161a and the large page 161b constituting the topology data 161 corresponding to the entire graph, and includes the read/write attribute data 162a and the read only attribute data 162b constituting the attribute data.

The device memory 172 includes the read/write attribute buffer 174 for processing the attribute data partially copied as outer data from the main memory 160, further includes the small page buffer 177 and the large page buffer 178 for processing the topology data, and further includes the read only attribute buffer 176.

For example, a PageRank algorithm requires attribute data for storing a calculated rank value, and topology data necessary for calculation. The attribute data are also divided into read/write attribute data for storing a next rank value and read only attribute data for storing a previous rank value.

According to the present invention, the larger scale graph data than the device memory 172 of the GPU can be processed by dividing the topology data into the small pages 161a and the large pages 161b having a fixed size corresponding to the topology data, the read/write attribute data 162a, and the read only attribute data 162b, copying only the read/write only data to the GPU in a chunk manner, and copying the other topology data and the read only attribute data to the GPU in a streaming manner to perform a join operation necessary for a graph algorithm.

The large-scale graph processing system using GPUs according to an embodiment of the present invention smoothly processes a breadth-first search algorithm and a PageRank algorithm among graph algorithms requiring different processing methods according to the graph algorithms as a method of processing different graph algorithms.

The graph algorithm is divided into a global query and a targeted query according to whether entire topology data is necessary or partial topology data is necessary in each process during processing of the entire algorithm.

A PageRank corresponds to the global query requiring all pieces of topology data in rank calculation of all vertices, whereas the breadth-first search is a method of searching for vertices connected by a trunk line around a start vertex that is a search reference, and corresponds to the targeted query requiring partial topology data.

Graph algorithms with different characteristics are classified into an algorithm similar to the PageRank (PageRank like algorithm) and an algorithm like the breadth-first search (BFS like algorithm) to perform processing.

In the case of the PageRank algorithm, a rank value of each vertex is partially processed through the topology data and the attribute data included in the device memory using the attribute major strategy.

In this case, the topology data is copied from the main memory to the device memory in a streaming method, and the rank values of vertices belonging to the copied pieces of topology data are calculated with a maximum of 32 pieces of the topology data including a small page and a large page overlapping in a GPU stream.

Meanwhile, the breadth-first search algorithm requires partial topology data in each step in searching for all vertices formed of trunk lines from a start vertex that is a reference.

A graph system using GPUs in the related art performs processing by scanning and searching for all pieces of topology data to perform search faster than a CPU.

However, according to such a method, the graph data of a scale that can be stored in the device memory can be rapidly processed, but when a larger-scale graph than the device memory is processed, a size of the topology data to be searched for increases as the scale of the graph increases, leading to degradation of the performance.

According to the present invention proposed to improve this degradation of the performance, there is proposed a method of recognizing the small page 161a and the large page 161b that are topology data necessary for search based on vertices searched for in each step, and searching for only the topology data necessary for search.

According to the present invention, for graph algorithms with different tendencies, by flexibly processing only the topology data necessary for execution of each algorithm, the graph algorithm having similar tendency as well as the graph algorithm that representatively processes the PageRank and the breadth-first search can be processed.

Figure 3A:
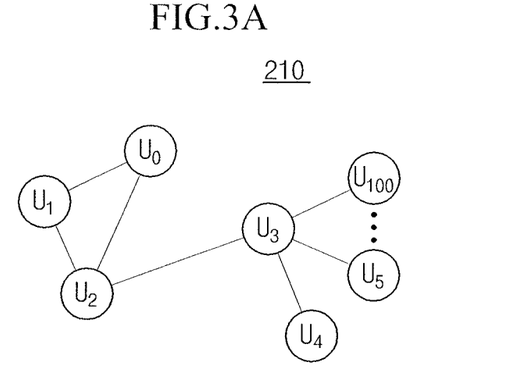
FIGS. 3A to 3C are diagrams illustrating a slotted page structure that is a graph data structure used in a large-scale graph processing system using GPUs according to an embodiment of the present invention.
Figure 3B:
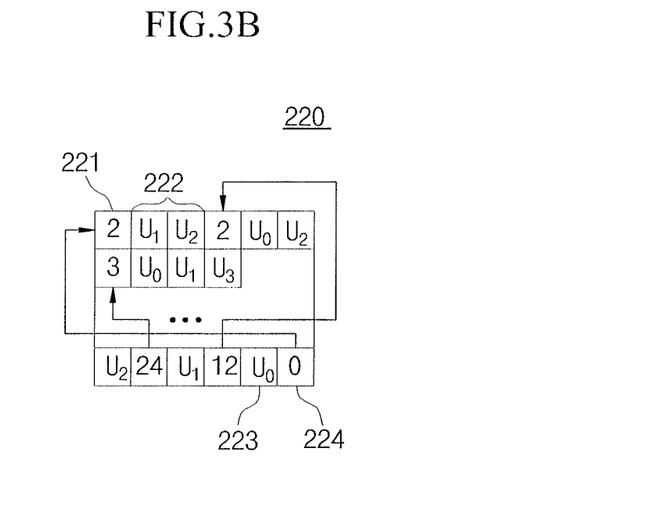
Figure 3C:
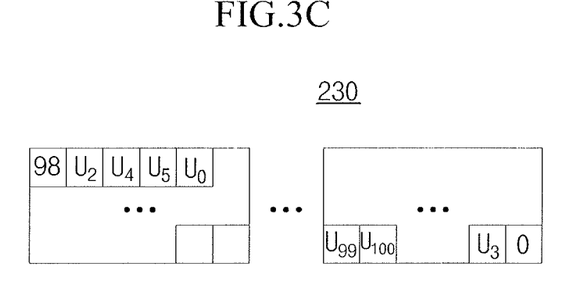

FIGS. 3A to 3C are diagrams illustrating a slotted page structure that is a graph data structure used in the large-scale graph processing system using GPUs according to an embodiment of the present invention.

As illustrated in FIG. 3a, when a graph G 210 is represented as a slotted page, vertices 0, 1 and 2 have relatively fewer neighboring vertices than vertex 3, and these vertices are stored in a small page illustrated FIG. 3b.

On the other hand, vertex 3 has relatively more neighboring vertices, and these vertices are stored in a large page illustrated in FIG. 3c when the vertices cannot be stored in one page.

The small page includes records and slots, and the records are stored from the start of the page and include the number 221 of neighboring vertices and information 222 regarding the neighboring vertices for the vertex.

The slots are stored from the end of the page, and include a vertex ID 223, and an offset 224 indicating the start of a record list for the vertex.

A structure of the small page is substantially similar to that of the large page, and the large page includes a vertex ID corresponding to the large page for each page.

Figure 4:
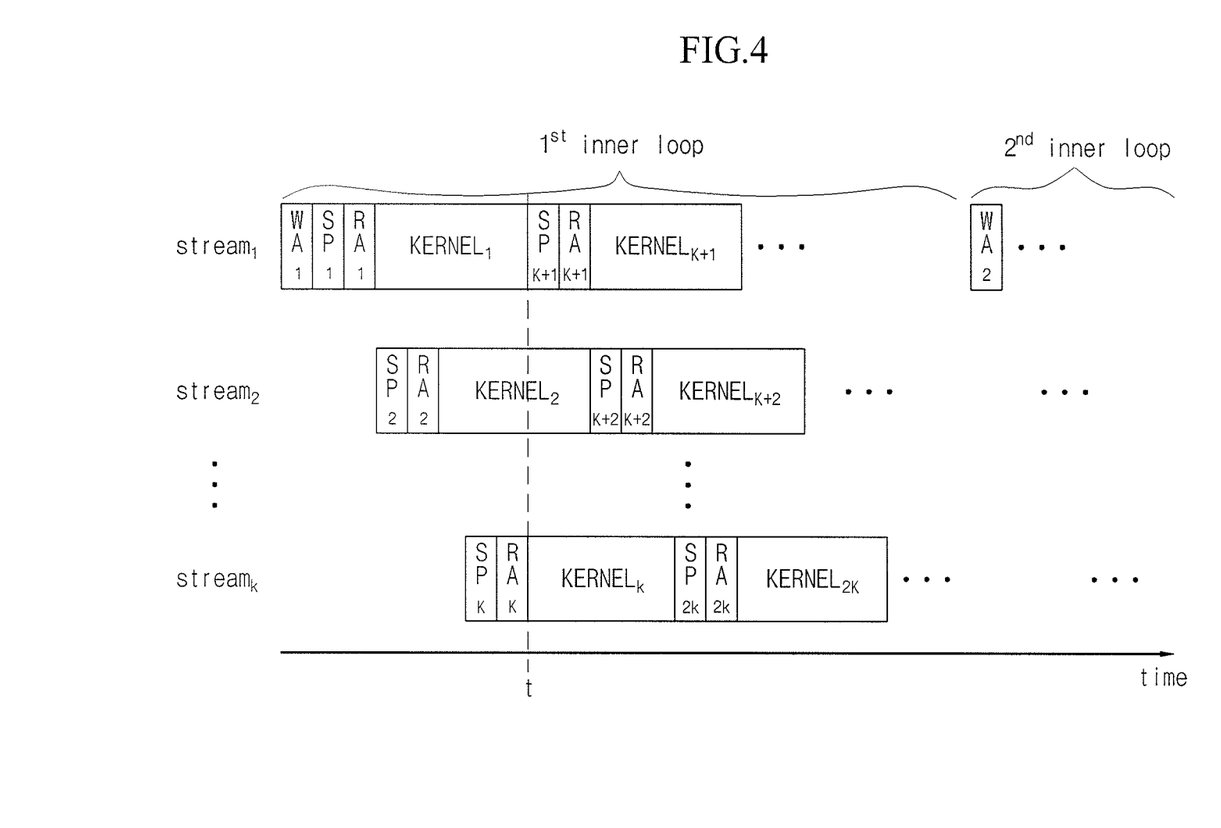
FIG. 4 is a diagram illustrating a process of copying a large number of streams from a main memory to a device memory based on a time axis according to an embodiment of the present invention.

FIG. 4 is a diagram illustrating a process of copying a large number of streams from the main memory to the device memory based on a time axis according to an embodiment of the present invention.

According to the embodiment of the present invention, a large number of GPU streams are used so as to perform a streaming process on the inner data 161a and 162b.

When the read/write attribute data is not stored in the device memory at a time according to a size of the graph data, the number of executions of the outer loop can increase according to the number divided by a chunk.

A kernel function executed by a thread cannot be performed before outer data 162a is copied to the device memory. Therefore, the thread repetitively performs a process of first transferring read/write attribute data to the read/write attribute buffer, copying a small page to the small page buffer based on a small page and a large page to be processed for several GPU streams, copying read only attribute data related to the small page to the read only attribute buffer, and performing the kernel.

In read/write attribute copy, read only attribute copy, and small page copy, the streams do not overlap due to limitation of GPU hardware, but in kernel execution work, a maximum of 32 overlaps are performed.

Figure 5:
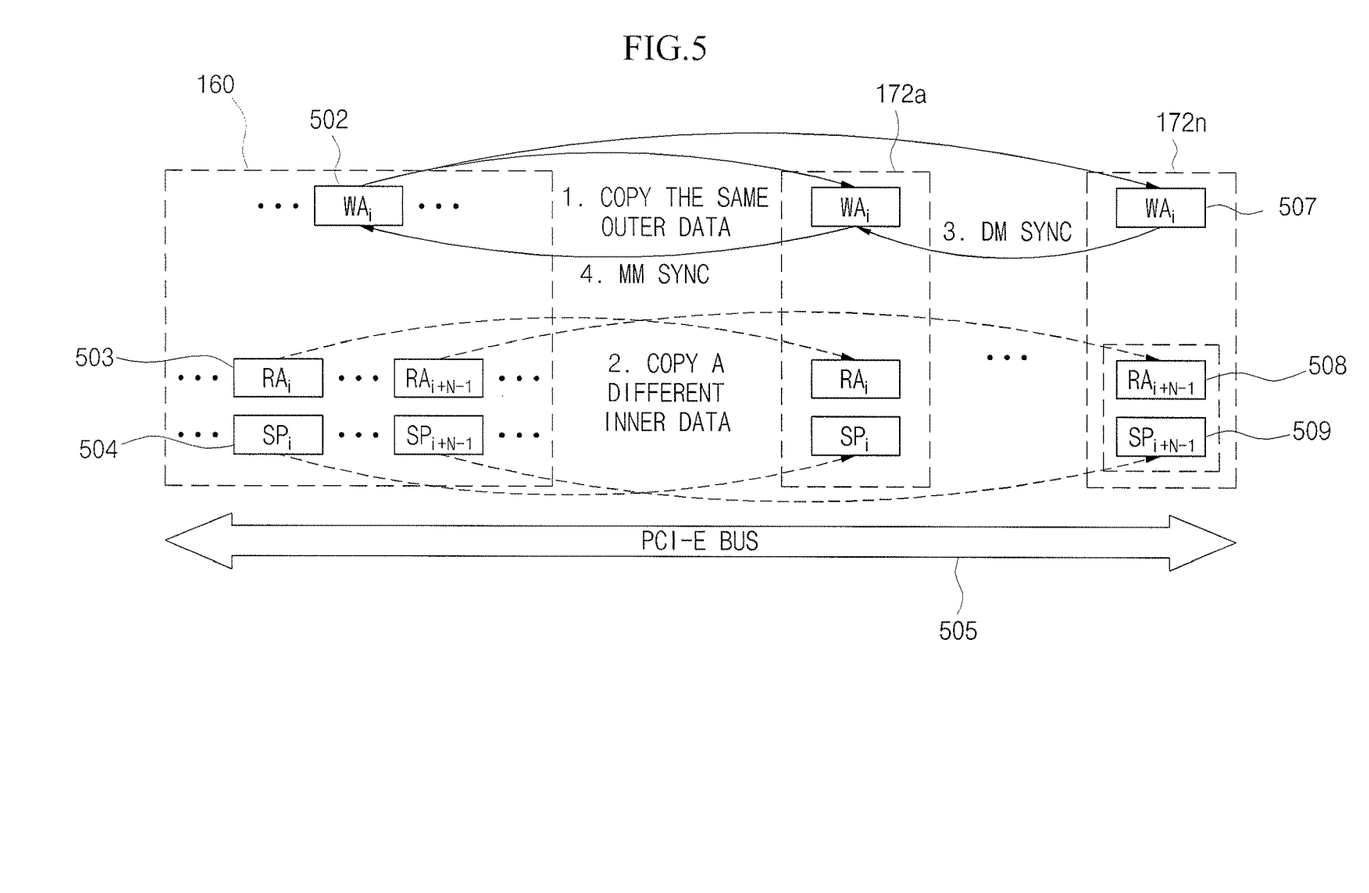
FIG. 5 is a diagram illustrating a data transfer flow and a synchronization flow when a streaming process is performed using a large number of GPUs according to an embodiment of the present invention.

FIG. 5 is a diagram illustrating a data transfer flow and a synchronization flow when a streaming process is performed using a large number of GPUs according to an embodiment of the present invention.

According to the embodiment of the present invention, read/write attribute data 502 corresponding to the same outer data in all GPUs is copied to an outer data buffer 507 by a chunk size, and a different small page 504 and read only attribute data 503 corresponding to the inner data are copied to inner data buffers 509 and 508 to perform processing.

That is, according to the embodiment of the present invention, the same read/write attribute data is copied to all the GPUs, and the different small pages and read only attribute data are copied to different GPUs (processing is similarly performed in the case of the large page), and then, the kernel is independently performed using the different topology data in each GPU.

According to the embodiment of the present invention, a workload balance manager 140 that assigns work among a plurality of GPUs in a balancing manner using a hash function using a MOD operation is included. Accordingly, potentially, processing performance is linearly improved as the number of GPUs increases.

According to the embodiment of the present invention, a synchronization manager 150 that synchronizes the value of the read/write attribute buffer changed at the time of processing of the graph algorithm with the main memory, the read/write attribute values of different result values included in read/write attribute buffers of a plurality of GPUs being synchronized, and the synchronized read/write attribute values being synchronized with the main memory, is included.

Work of performing synchronization through copying from the device memory to the main memory in synchronizing result values of memories present in different physical spaces leads to a great overhead.

In this case, the overhead means an overhead caused by a process of performing synchronization work through copying of attribute data partially changed in device memories of all GPUs to the main memory and then copying the synchronized value to the device memories of the GPUs again.

Therefore, according to the embodiment of the present invention, high speed synchronization can be performed by directly performing synchronization of the read/write attribute data with the device memory using a peer-to-peer memory copying method.

According to the embodiment of the present invention, a cache manager 130 that confirms whether there is the topology page requiring search in the device memory through caching at the time of executing a targeted query algorithm is included. That is, according to the embodiment of the present invention, an available space of the device memory remaining after the small page buffer, the large page buffer, the read/write attribute buffer, and the read only attribute buffer are assigned to the device memory is utilized.

This page caching method is a method that is effective in a search algorithm that repetitively searches for the same page during execution of the algorithm.

When a page to be searched for is already present in the device memory, copying from the main memory is not performed, and the page present in the device memory is used to perform search based on a user-defined kernel.

In this case, a least recently used (LRU) caching algorithm is typically used. According to the embodiment of the present invention, other caching algorithms can be applied, in addition to the LRU.

When the read/write attribute buffer, the read only attribute buffer, the small page buffer, and the large page buffer are assigned to the device memory, there is an additionally available space.

According to the embodiment of the present invention, when the inner data such as the small page and the large page is transferred in a streaming manner, the performance is maximized through caching.

For example, when the breadth-first search algorithm is processed, a size of the read/write attribute data corresponding to the outer data occupies a small space as an attribute value for confirming whether a search target vertex has been searched for, and a size of the additionally available space in the device memory relatively increases.

That is, a space that can be utilized as a buffer for caching increases, and thus, the performance is improved.

In the case of the graph algorithm such as breadth-first search, the same page should be repetitively searched for during the search. When a page to be searched for is already present in the device memory through caching, unnecessary copying from the main memory may not be performed.

As a result, when there are S small pages and L large page as the topology data of the graph data, a cache hit rate is calculated by B/(S+L) when it is assumed that there are B pages reused as the cache.

Figure 6:
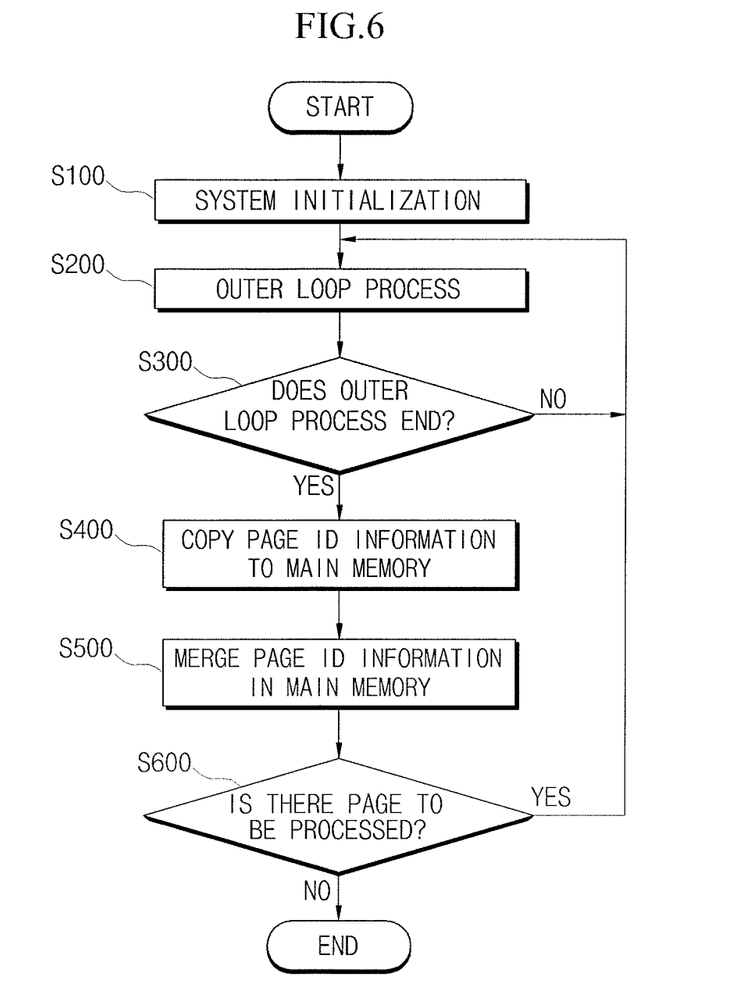
FIG. 6 is a flowchart illustrating a large-scale graph processing method using GPUs according to an embodiment of the present invention.

FIG. 6 is a flowchart illustrating a large-scale graph processing method using GPUs according to an embodiment of the present invention.

According to the embodiment of the present invention, the large-scale graph processing method using GPUs includes a system Initialization step (S100), an outer loop processing step (S200), a step of copying information regarding the page IDs that can be used as a cache in next inner loop work and information regarding the page IDs to be processed in a next inner loop process to a main memory, the information being currently stored in the device memory (S400), a step of merging page IDs information for a small page and a large page to be processed in a next step in main memory (S500), and a step of confirming whether there is a page to be processed in a processing-required set nextPIDSet (S600).

Figure 7:
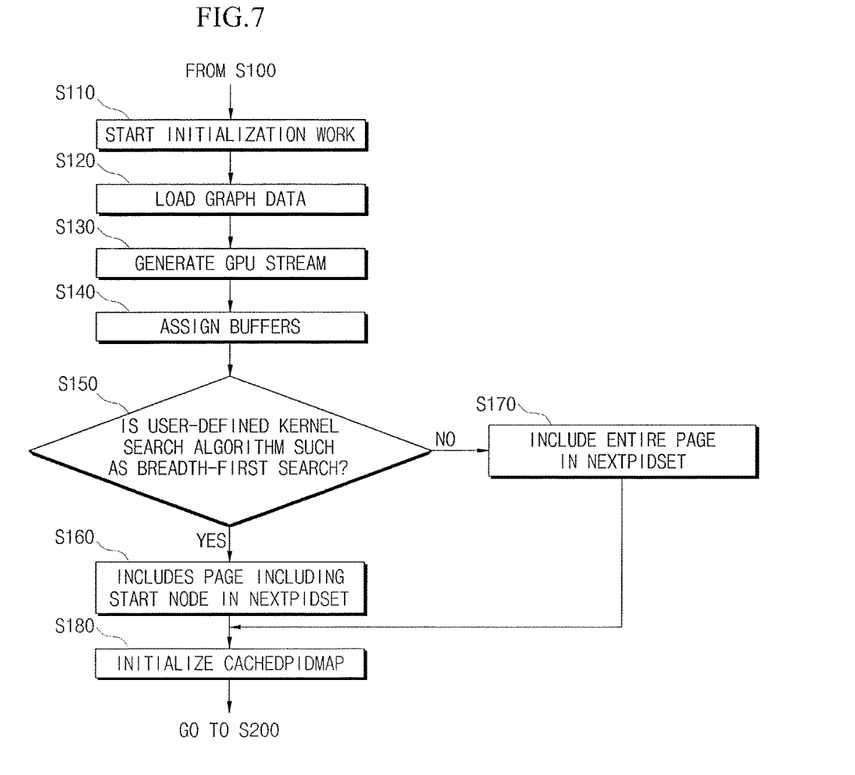
FIG. 7 is a detailed flowchart illustrating a system initialization step of the large-scale graph processing method using GPUs according to the embodiment of the present invention.

FIG. 7 is a detailed flowchart illustrating a system initialization step of the large-scale graph processing method using GPUs according to an embodiment of the present invention.

According to the embodiment of the present invention, graph data to be processed is first loaded from a disk to the main memory (S120), as illustrated in FIG. 7. Then, as prior work for processing, a GPU stream for processing a small page and a large page is generated in each GPU (S130), and the read/write attribute buffer corresponding to the outer data, and the read only attribute buffer, the small page buffer, and the large page buffer corresponding to the inner data are assigned to the device memory of each GPU (S140).

The graph algorithm is greatly divided into the algorithm similar to the PageRank (PageRank like algorithm), and the algorithm similar to the breadth-first search (BFS like algorithm), as described above.

A great difference between these algorithms is whether processing is performed using all pieces of topology data in each step when the algorithm is performed or the processing is performed using partial topology data.

According to the embodiment of the present invention, it is confirmed whether a user-defined kernel is a search algorithm such as a breadth-first search (S150). When the user-defined kernel is a search algorithm such as a breadth-first search, a page including a start node is caused to be included in a processing-requested set nextPIDSet (S160).

On the other hand, when the user-defined kernel is an algorithm such as a PageRank, the entire page is caused to be included in the processing-requested set nextPIDSet (S170).

According to the embodiment of the present invention, a caching method is used for utilization of an available space, as described above. Since there is no topology page that can be utilized as a cache before the algorithm is executed, cachedPIDMap is initialized (S180).

Figure 8:
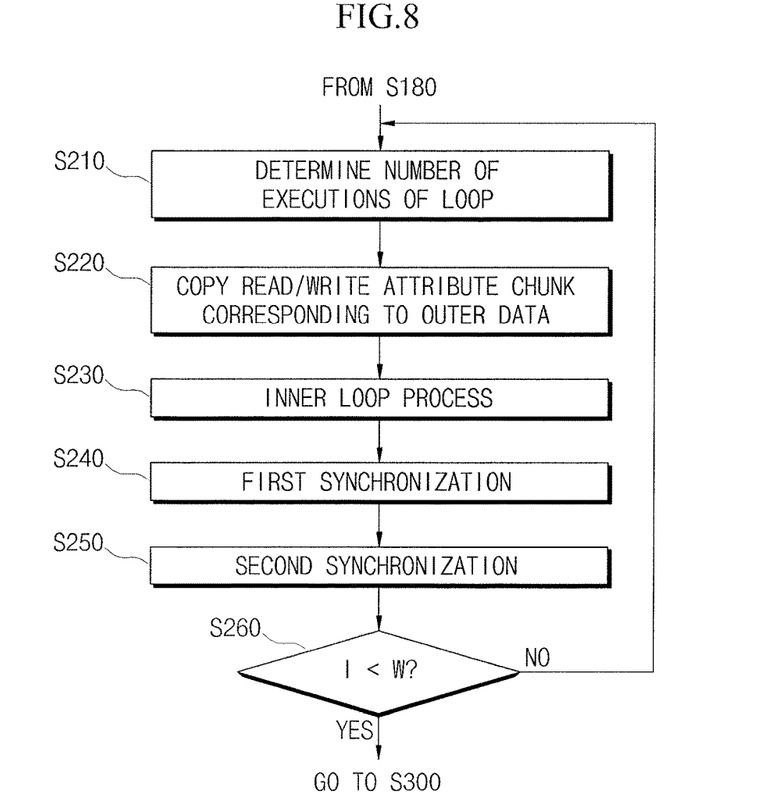
FIG. 8 is a detailed flowchart illustrating an outer loop algorithm of the large-scale graph processing method using GPUs according to the embodiment of the present invention.

FIG. 8 is a detailed flowchart illustrating an outer loop algorithm of the large-scale graph processing method using GPUs according to an embodiment of the present invention.

According to the embodiment of the present invention, the number of the chunks of the read/write attribute corresponding to the outer data is determined according to the scale of the graph, and the number of executions of the loop for the outer data is determined by the number of chunks (S210).

First, the read/write attribute chunk corresponding to the outer data is copied to the read/write attribute buffer assigned to the device memory of the GPU (S220), and the inner loop (S230) and the synchronization work (S240, S250) are performed.

For example, in the synchronization work, when the synchronization between the device memories having the different read/write attribute result values is performed, first synchronization in which the read/write attribute result values are copied to the GPU corresponds to a first GPU is first performed (S240).

Then, the synchronized result value in the device memory of the first GPU is copied to the main memory to perform second synchronization (S250). This process is repeated by the number of read/write attribute chunks, and when there is no longer chunk to be processed, the process ends.

Figure 9:
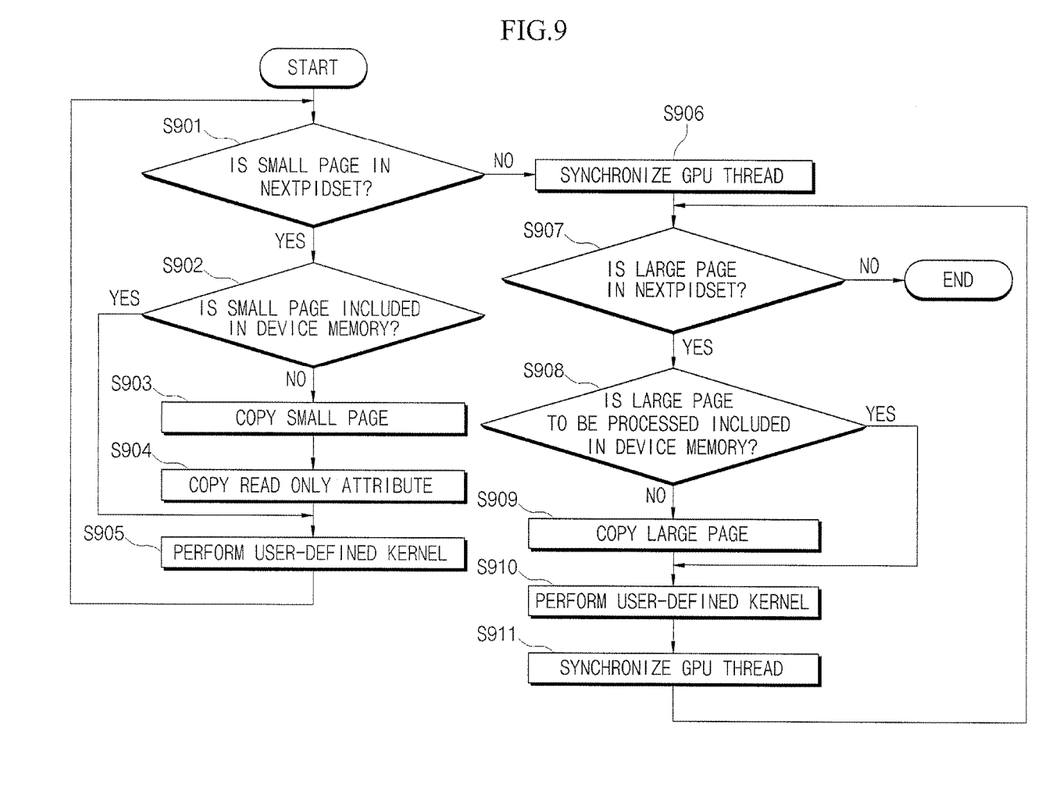
FIG. 9 is a detailed flowchart illustrating an inner loop algorithm of the large-scale graph processing method using GPUs according to the embodiment of the present invention.

FIG. 9 is a detailed flowchart illustrating an inner loop algorithm of the large-scale graph processing method using GPUs according to an embodiment of the present invention.

According to the embodiment of the present invention, the small page is processed and then the large page is processed for balanced work between the small page and the large page including information regarding a different number of nodes.

For example, the small page includes a plurality of vertices having neighboring vertices that can be included in one page, whereas the large page includes a plurality of vertices having neighboring vertices that cannot be included in one page, resulting in a number of pages, as described above in description of FIG. 3.

Based on single instruction multiple thread (SIMT) characteristics of the GPU, the large page in which the neighboring vertices for the different vertices are not processed is processed at higher speed than the small page.

Therefore, when the small page and the large page are processed together, unbalanced work is performed and degradation of the performance is caused.

Therefore, the inner loop is executed after it is confirmed that there is a small page to be processed in the processing-requested set (nextPIDSet) (S901). In a multi-GPU environment, different GPUs process different pieces of page data using a hash function.

When the small page to be processed has been already included in the device memory, copying (S903 and S904) of the small page and the read only attribute corresponding to the inner data is not performed, and a user-defined kernel for performing the graph algorithm is performed (S905).

Thereafter, all small pages included in the processing-requested set nextPIDSet are processed, and then, synchronization of the GPU thread for waiting for the end of the GPU stream in which different pages are processed is performed (S906).

After all the small pages are processed, it is confirmed whether there is a large page to be processed in the processing-requested set nextPIDSet (S907), and the inner loop is executed according to a result of the confirmation. In a multi-GPU environment, different GPUs process different page data using a hash function, as described above.

When the large page to be processed has been already included in the device memory, copying (S909) of the large page corresponding to the inner data is not performed, and a user-defined kernel for performing a graph algorithm is performed (S910).

Here, since the number of reference vertices included in the large page is one, read information necessary when a kernel for processing the large page is performed can be delivered, and thus, copying of the read attribute is not separately performed, unlike the small pages.

After all the large pages included in the processing-requested set nextPIDSet are processed, GPU thread synchronization for waiting for the end of the GPU stream in which different pages are processed is performed (S911).

The system and the method according to the embodiment of the present invention include cost models of the algorithm such as a PageRank and the algorithm such as breadth-first search proposed as representative graph algorithms, so as to assist in understanding of performance tendency.

All cost models are greatly divided into an outer data transfer cost, an inner data transfer cost, a user-defined kernel processing cost, and a synchronization cost. Accordingly, the cost model for the algorithm such as a PageRank is proposed as Expression 1 below.

$$\frac{2|WA|}{c1} + W \times \left\{ \frac{|RA| + |SP| + |LP|}{c2 \times N} + t_{call}\left(\frac{S+L}{N}\right) + t_{kernel}(SP_{|1|} + LP_{|1|}) + t_{sync}(N) \right\} \quad \text{[Expression 1]}$$

c1: Transfer rate (MB/s) between the main memory and the device memory when chunk copying is performed c2: Transfer rate (MB/s) between the main memory and the device memory when steaming copying is performed $t_{call}(x)$: Load time generated to call an $x^{th}$ user-defined kernel $t_{kernel}(y)$: Time taken to perform $y^{th}$ user-defined kernel $t_{sync}(z)$: Time taken to perform synchronization between z GPUs $2|WA|/c1$ in the cost model of the algorithm such as the PageRank means a time taken to copy all $WA_i$ (read/write attribute chunks) from the main memory to the device memory and a time taken to copy $WA_i$ from the device memory to the main memory.

$(|RA|+|SP|+|LP|)/c2$ is an inner loop execution time. A corresponding process is work that can be divided for N GPUs and processed at the same time. A total execution time for data in the inner loop is divided by N.

$t_{call}(S+L)$ is a load time generated to call the user-defined kernel due to the number of small pages and large pages. The load time generated to call the kernel is divided by N, as in a case in which the data in the inner loop is divided for N GPUs and processed.

$t_{kernel}(SP_{|1|}+LP_{|1|})$ is an execution time for the small page and the large page that are last processed. A maximum of 32 executions between the kernels can be simultaneously performed, but data copying cannot be hidden by data streaming copying due to no overlap at the same time.

The algorithm such as a PageRank is an algorithm in which a time taken to execute the user-defined kernel is longer than a time generally taken to transfer data. Even when the algorithm is processed by a multi-GPU, the time is proportional to a time of a last kernel.

$t_{sync}(N)$ is a synchronization time taken among N GPUs for WA (read/write attribute chunk) and increases as the number of GPUs increases.

The following relates to a case in which an algorithm such as breadth-first search is processed, and an expression of the cost model is as shown in Expression 2 below.

$$\frac{2|WA|}{c1} + \sum_{l=0}^{depth} \left\{ \frac{|RA_{\{l\}}| + |SP_{\{l\}}| + |LP_{\{l\}}|}{c2 \times N \times d_{skew}} \times (1 - r_{hit}) + t_{call}\left(\frac{S_{\{l\}} + L_{\{l\}}}{N \times d_{skew}}\right) \right\} \quad \text{[Expression 2]}$$

depth: Search level $SP_{\{l\}}$: The number of small pages necessary when an $l^{th}$ level is searched for $d_{skew}$: The degree of workload skewness among GPUs $r_{hit}$: The number of reused pages mentioned in the caching method described above/(a total of small pages necessary for all level search+a total of large pages necessary for all level search)

In the case of the algorithm such as breadth-first search, the read/write attribute data occupies a relatively small size, unlike the algorithm such as a PageRank algorithm.

That is, since all pieces of read/write attribute data can be stored in the device memory, the data may be copied to the main memory and the synchronization may be performed when entire search ends, instead of the data being copied to the main memory and the synchronization being performed when the search ends in each level. For this reason, in the case of $2|WA|/c1$, the process may be once performed, unlike the algorithm such as a PageRank.

$(|RA|+|SP|+|LP|)/c2$ indicates a time taken to transfer the inner data as described above in the cost model of the algorithm such as a PageRank, and is similarly divided by N when there are N device memories.

$(|RA|+|SP|+|LP|)/c2$ is additionally divided by device $d_{skew}$. Specifically, $d_{skew}$ indicates a workload balance ratio among the device memories through the breadth-first search. $d_{skew}$ has a value of 1 when all the GPUs have the same workload, and a value of 1/N in the worst case in which the workload is concentrated on one GPU.

$(1-r_{hit})$ indicates effects of the cache and has a value from 0 to 1. 0 indicates a case in which there is no page data utilized as the cache, and 1 indicates a case in which there are all pieces of page data in the device memory.

$t_{kernel}(y)$ indicates a time for which a user-defined kernel such as breadth-first search is performed. In the breadth-first search, since a load of kernel execution is not high like an algorithm such as a PageRank, $t_{kernel}(y)$ does not greatly affect the performance.

$t_{call}(S_{\{l\}}+L_{\{l\}})/(N \times d_{skew})$ indicates $t_{sync}(z)$ that is a time taken for synchronization. $S_{\{l\}}$ indicates the number of small pages visited at an l-level as specified above. Only a part of the attribute data of which the value is changed through visiting may be synchronized. $t_{call}(S_{\{l\}}+L_{\{l\}})/(N \times d_{skew})$ is divided by the number of GPUs*$d_{skew}$.

When the scale of data increases through the above-described expressions, and the read/write attribute data corresponding to the outer data is not basically stored at a time, the number of executions of the outer data will be increased by W. Meanwhile, sizes of the small page, the large page, and the read attribute data corresponding to the inner data increase.

Also, as the number of GPUs capable of processing increases, a longest inner loop processing time in the entire graph processing can be shortened through the process of dividing the inner data.

The embodiment of the present invention shows scalable performance according to a scale of the graph and the number of GPUs in processing larger-scale graph data than the device memory based on the above-described cost model, unlike a system in the related art.

The embodiments of the present invention have been described above. It will be understood by those skilled in the art that the present invention can be implemented in modification forms without departing from the essential characteristics of the present invention. Therefore, the disclosed embodiments should be considered from an illustrative point of view rather than a restrictive point of view. The scope of the present invention is shown in claims rather than the detailed description described above, and it should be construed that all differences in its equivalent scope are included in the present invention.

DESCRIPTION OF REFERENCE NUMERALS

110: loop controller
120: streaming controller
130: cache manager
140: workload balance manager
150: synchronization manager
160: main memory
161: topology data
162: attribute data
170: GPU
171: core
172: device memory
174: read/write attribute buffer
175: inner data
176: read only attribute buffer
177: small page buffer
178: large page buffer

What is claimed is:

1. A large-scale graph processing system using GPUs, comprising:
a main memory including graph data;
device memories of a plurality of GPUs that are configured to process the graph data transferred from the main memory;
a first processor configured to process graph data transfer in a nested loop join scheme in the graph data transfer between the main memory and the device memory of the GPU; and
a second processor configured to copy the graph data to the device memory of the GPU in a chunk and/or streaming manner using a GPU stream according to the nested loop join scheme;
wherein the second processor is configured to copy outer data included in the graph data to the device memory of the GPU in a chunk manner, and copy inner data included in the graph data to the device memory of the GPU in a streaming manner, and the large-scale graph processing system is configured to process the graph data by using the GPUs, a scale of the graph data being greater than a capacity of the device memory of the GPU.

2. The system according to claim 1,
wherein the main memory includes greater scale graph data than the capacity of the device memory of the GPU, and the graph data includes topology data and attribute data.

3. The system according to claim 2,
wherein the second processor is configured to copy read/write attribute data among pieces of the attribute data as outer data in a chunk manner, and copy read only attribute data among the pieces of the attribute data and the topology data as inner data in a streaming manner.

4. The system according to claim 3,
wherein the second processor is configured to copy the topology data in a streaming manner using a slotted page structure.

5. The system according to claim 2,
wherein the device memory of the GPU includes a read/write attribute buffer that processes the read/write attribute data, a read only attribute buffer that processes the read only attribute data, and a page buffer that processes the topology data.

6. The system according to claim 2, further comprising:
a third processor configured to confirm whether there is a topology page requiring search in the device memory through caching when a targeted query algorithm is executed.

7. The system according to claim 2,
wherein the second processor is configured to copy the same read/write attribute data included in the main memory to read/write attribute buffers of the device memories of the plurality of GPUs, and copy different topology data and read only attribute data included in the main memory to page buffers and read only attribute buffers of the device memories of the different GPUs, respectively, and each GPU independently performs a kernel using the different topology data.

8. The system according to claim 1, further comprising:
a fourth processor configured to assign work among the plurality of GPUs in a balancing manner using a hash function using a MOD operation.

9. The system according to claim 8, further comprising:
a fifth processor configured to synchronize a value of the read/write attribute buffer changed at the time of processing of the graph algorithm with the main memory, different read/write attribute values of included in read/write attribute buffers of the plurality of GPUs being synchronized, and the synchronized read/write attribute values being synchronized with the main memory.

* * * * *